United States Patent [19]

O'Leary et al.

[11] 4,147,599
[45] * Apr. 3, 1979

[54] PRODUCTION OF ALKALI METAL CARBONATES IN A CELL HAVING A CARBOXYL MEMBRANE

[75] Inventors: Kevin J. O'Leary, Cleveland Heights; Charles J. Hora, Willoughby Hills; Donald L. DeRespiris, Mentor, all of Ohio

[73] Assignee: Diamond Shamrock Corporation, Cleveland, Ohio

[ * ] Notice: The portion of the term of this patent subsequent to Mar. 21, 1995, has been disclaimed.

[21] Appl. No.: 817,007

[22] Filed: Jul. 19, 1977

[51] Int. Cl.² .............................................. C25B 1/14
[52] U.S. Cl. ...................................... 204/87; 204/98; 204/296
[58] Field of Search .......................... 204/87, 98, 296

[56] References Cited

U.S. PATENT DOCUMENTS

| 2,967,807 | 1/1961 | Osborne et al. | 204/87 |
|---|---|---|---|
| 3,374,164 | 3/1968 | Bales et al. | 204/87 |
| 3,899,403 | 8/1975 | Cook et al. | 204/98 |
| 3,976,549 | 8/1976 | Falvo | 204/296 |

FOREIGN PATENT DOCUMENTS 205953 6/1976 Argentina.

Primary Examiner—T. Tung
Attorney, Agent, or Firm—Theodore J. Dettling

[57] ABSTRACT

An alkali metal carbonate substantially free of alkali metal chloride is efficiently produced by electrolyzing an alkali metal chloride in an electrolytic cell having anolyte and catholyte compartments separated by a cation-exchange hydraulically impermeable membrane comprised of a thin film of a fluorinated polymer having pendant carboxylic acid or alkali metal carboxylate groups and a cathode spaced apart from the membrane, injecting into the catholyte compartment of the cell carbon dioxide in a quantity sufficient to convert substantially all the alkali metal hydroxide forming therein to the alkali metal carbonate salt, and utilizing a magnitude of electrolyzing current that reduces alkali metal chloride in the catholyte solids to less than 400 ppm.

18 Claims, 2 Drawing Figures

PRODUCTION OF ALKALI METAL CARBONATES IN A CELL HAVING A CARBOXYL MEMBRANE

BACKGROUND OF THE INVENTION

This invention relates generally to a process for electrolytically producing an alkali metal carbonate. More particularly it relates to an improved process for electrolytically producing an alkali metal carbonate directly in a membrane cell employing particular permselective cation-exchange membranes and operating conditions.

It is known that alkali metal carbonate can be electrolytically produced directly from alkali metal chlorides in diaphragm and membrane cells by introducing carbon dioxide into the catholyte. However, processes presently known have deficiencies in one or more important particulars.

For example, U.S. Pat. No. 3,374,164 discloses that modern diaphragm cells, wherein the diaphragm is affixed to the cathode, while capable of operating at 95 to 96% electrolytic efficiency, only convert 60% of the alkali metal ions migrating through the diaphragm to the carbonate salt. Further, the patent discloses that even when the diaphragm is separated from the cathode and carbon dioxide is introduced into the resulting space, conversion efficiency can only be raised to 80% maximum. In either case, the carbonate salt is contaminated with unacceptable concentrations of chloride salt that must be removed by additional separate purification steps raising costs to noncompetitive levels.

U.S. Pat. No. 2,967,807, on the other hand, in Example III discloses that membrane cells of the prior art also produce carbonate salts having an appreciable level of chloride salt impurities. Additionally, the operating conditions specified in this Example, viz. 90 amperes/ft.$^2$ (0.62 amperes/in.$^2$) at an imposed voltage of 3.8–4.2, indicate that membrane cells require appreciably more energy and, thus, are considerably less efficient than diaphragm or mercury cells, and that they, therefore, would be unsuitable economically for the commercial production of alkali metal carbonate salts.

Because of these deficiencies, a significant quantity of high purity alkali metal carbonates, and especially potassium carbonate, is commercially made by carbonating alkali metal hydroxides produced from mercury cells. This, of course, involves the installation of auxiliary carbonation equipment and separate additional processing steps, both of which increase costs. However, the factor most militating against the use of mercury cells for the production of alkali metal carbonates is their potential to contaminate the environment. To minimize such contamination to acceptable levels, considerable monies must be spent for pollution control means and significantly higher operating costs are entailed.

In view of the foregoing, the industry has endeavored to develop processes that are capable of producing alkali metal carbonates having the purity of mercury cell products and at the same time the nonpolluting characteristics of the diaphragm and membrane cell processes. To date, this has not been achieved.

SUMMARY OF THE INVENTION

Considering this state of the art, it is an object of this invention to provide a process for the production of alkali metal carbonates having an order or purity of products derived from mercury cells without the need for the carbonation and pollution control equipment and procedures that characterize the mercury cell production of carbonates.

A further object is the provision of a process that permits the economical production of such alkali metal carbonates directly in an electrolytic cell.

These and still other objects, which will become apparent from the following description and claims, are achieved by electrolyzing an alkali metal chloride in an electrolytic cell having anolyte and catholyte compartments separated by a permselective, cation-exchange, hydraulically impermeable membrane of particular composition and properties, as described hereinafter, that is spaced apart from the cathode of the cell; injecting carbon dioxide into the catholyte compartment of the cell in a quantity sufficient to convert substantially all the alkali metal hydroxide forming therein to alkali metal carbonate; utilizing an electrolyzing current density of sufficient magnitude to reduce the alkali metal chloride in the catholyte solids to less than 400 ppm; and removing the alkali metal carbonate from the catholyte compartment.

DESCRIPTION OF THE PREFERRED EMBODIMENTS

In the following description and claims, all parts are by weight, unless otherwise indicated.

Figure 1:
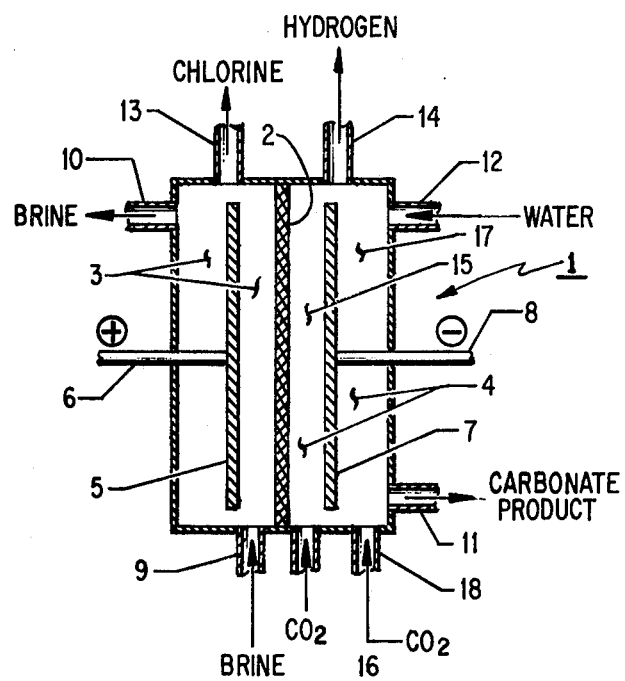
FIG. 1 is a side cross-sectional view of an electrolytic membrane cell that can be used to produce an alkali metal carbonate in accordance with the invention process.

In FIG. 1 there is illustrated a cell 1 separated by membrane 2 into an anode compartment 3 and a cathode compartment 4. In anode compartment 3, an anode 5 is shown mounted in a generally parallel, spaced-apart relationship to the membrane 2 and is connected to the positive terminal of an electrical supply source, not shown, by anode lead 6. Similarly, in cathode compartment 4 there is mounted a cathode 7 in a generally parallel, spaced-apart relationship to the membrane 2. The cathode 7 is connected to the negative terminal of an electrical supply source, not shown, by cathode lead 8.

Alkali metal chloride brine is charged to the anode compartment 3 through inlet 9 and depleted brine exits through outlet 10. Aqueous alkali metal carbonate product is removed from the cathode compartment 4 through outlet 11 while water, if required or desired to be added to the carbonate product, is charged through inlet 12. Chlorine and hydrogen gases are discharged through outlet vents 13 and 14 respectively. Carbon dioxide is injected into the cathode compartment 4 either into catholyte space 15 between the membrane 2 and the cathode 7 through inlet 16, or, alternatively, into catholyte space 17 behind the cathode 7 through inlet 18.

Figure 2:
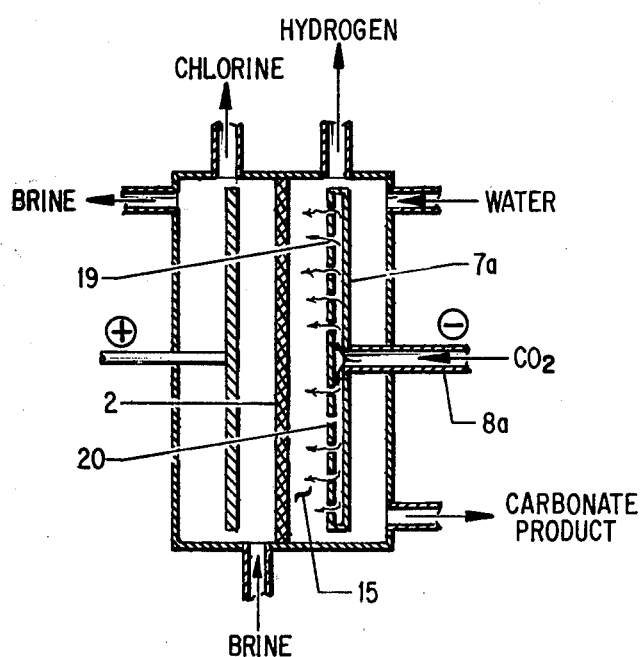
FIG. 2 is a similar view of a second cell configuration useful in the invention process having cathode means for introducing carbon dioxide into the catholyte.

The cell of FIG. 2 is identical to that of FIG. 1 except for the means of introducing carbon dioxide. In the cell illustrated in FIG. 2, the cathode lead 8a is a tube through which carbon dioxide is admitted and conveyed to a hollow cathode 7a having a multitude of apertures 19 in the side member 20 of the cathode 7a facing the membrane 2. As is apparent, with this cathode configuration carbon dioxide flows out through the apertures 19 into catholyte space 15 between the membrane 2 and the cathode 7a. Side member 20 may, for example, be a solid metal sheet or plate having multiple holes drilled therethrough to form the apertures 19, or it may be a sheet or plate of sintered metal particles having interstices forming the multiple apertures 19. Further, while FIG. 2 depicts the apertures 19 as being over essentially the whole area of side member 20, this is not mandatory since good results can be obtained when hollow cathode 7a has the plurality of apertures 19 disposed only in the lower portion of side member 20.

The anode 5 may be any conventional electrically conductive electrolytically-active material resistant to the anolyte, such as graphite or, more preferably, a valve metal such as titanium, tantalum or alloys thereof bearing on its surface a noble metal, a noble metal oxide (either alone or in combination with a valve metal oxide), or other electrolytically active, corrosion-resistant material. Anodes of this preferred class are called dimensionally stable anodes and are well know and widely used in industry. See, for example, U.S. Pat. Nos. 3,117,023; 3,632,498; 3,840,443; and 3,846,273. While solid anodes may be used, generally, formaninous anodes, such as expanded mesh sheet, are preferred since they have greater electrolytically-active surface areas and facilitate the formation, flow and removal of the chlorine gas in the anolyte compartment 3.

The cathode 7, similarly, may be any conventional electrically conductive material resistant to the catholyte such as iron, mild steel, stainless steel, nickel, and the like, and preferably will be foraminous (screen, expanded mesh, apertured and the like), or will consist of a vertical array of spaced apart plates disposed generally perpendicular to the plane of the membrane (such as disclosed in South African Application 73,8433) to facilitate the generation, flow and removal of hydrogen gas in the catholyte compartment 4. When, as described hereinafter, carbon dioxide is introduced through inlet 18 into the space 17 behind the cathode 7 and the cathode 7 is virtually coextensive with the cross-sectional area of the catholyte compartment 4, thus limiting or preventing catholyte flow, then the cathode 7 should be foraminous so that the carbon dioxide gas and/or alkali metal bicarbonate formed by reaction of the carbon dioxide with alkali metal carbonate can be carried by catholyte currents to the catholyte space 15 between the membrane 2 and the cathode 7.

The permselective, cation-exchange, hydraulically-impermeable membrane 2 in one embodiment of the invention process consists essentially of a film of a fluorinated polymer having recurring structural units of the formula:

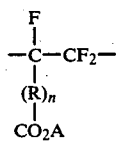

(I)

and (II) —CXX′—CF$_2$— wherein R represents the group

in which Y is fluorine or trifluoromethyl, G is —CF$_2$— or

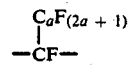

m is 1, 2 or 3, e is 0 or 1, and a is an integer from 1 to 10; n is 0 or 1; A is H, Na or K; X is fluorine, chlorine, or trifluoromethyl; X′ is X or CF$_3$—(CF$_2$)$_z$ wherein z is 0 or an integer from 1 to 5. In the copolymer, the units of formula (I) should be present in an amount such that the copolymer has in the acid -CO$_2$H form an equivalent weight of about 800 to 1400, and the capability of absorbing at least about 15% by weight water (as determined on a film of the copolymer 1–10 mils in thickness immersed in 100° C. water in accordance with ASTM D-570-63, paragraph 6.5). Especially preferred are membranes having a water absorption of about 20% or greater. Membranes having less water absorption require higher cell voltages at any given current density and are, hence, less power efficient. Membranes having a film thickness (unlaminated) of about 8 mils or less are preferred, because thicker membranes require higher voltages in the invention process and, thus, are less able to compete with other electrolysis methods of producing alkali metal carbonates, such as hereinbefore described. Particularly preferred at this time are membranes made with copolymers having recurring units of (III) —CF$_2$—CF$_2$— and

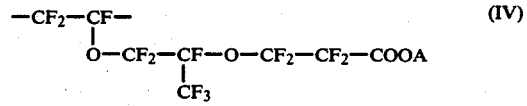

(IV)

or

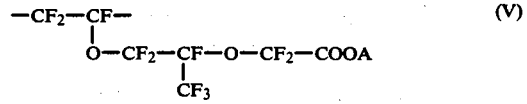

(V)

and a —COOH equivalent weight of about 900 to 1200.

Typically, because of the large surface areas of membranes present in commercial cells, the membrane film will be laminated to and impregnated into a hydraulically permeable, electrically non-conductive, inert, reinforcing member such as a woven or nonwoven fabric made from fibers of asbestos, glass, TEFLON and the like. In film/fabric composite membranes, it is preferred that the laminate have an unbroken surface of the film resin on both sides of the fabric to prevent leakage through the membrane caused by seepage along the fabric yarns. One method for manufacturing such composites that may be used is that disclosed in U.S. Pat. No. 3,770,567. Alternatively, a film of the copolymer may be laminated to each side of the fabric. The thickness of the membrane "film" when this is done would be the sum of the two films' thicknesses. In either instance, lamination is facilitated by using a membrane film in which the COOA groups are either in the acid or methyl ester form, because both are more thermoplastic than the alkali metal salt form. If the ester form of the copolymer is employed, the acid or alkali metal salt form used in the invention is obtained by hydrolyzing the membrane copolymer with water or the desired alkali metal hydroxide after lamination.

Membrane copolymers where e is 1 in recurring unit I may be made by copolymerizing the ethylenically unsaturated monomer form of units I and II (monomer I being in the methyl ester form) in a perfluorocarbon solvent or in bulk using a perfluorinated free-radical initiator, as is known to those skilled in the art, and is shown, for example, in U.S. Pat. No. 3,282,875. The methyl ester monomer of unit I where e is 1 can be made in a manner analogous to the following illustrating the synthesis of the ester monomer form of unit IV.

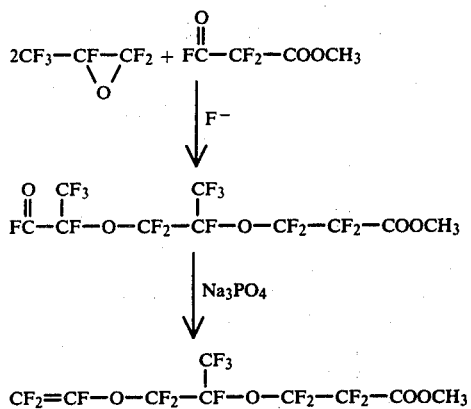

Membrane copolymers where e is 0 in recurring unit I are simply made by treating a film (either laminated or unlaminated) of a copolymer of the desired compositon having —O—CF$_2$—CF$_2$—SO$_2$F groups according to the following reaction scheme:

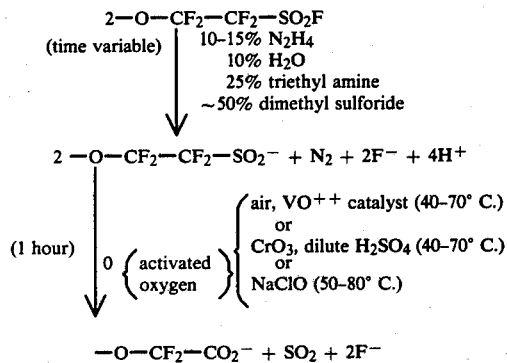

Membrane films and laminates having —SO$_2$F groups, which can be used, are disclosed in applicants' copending U.S. Ser. No. 707,215 and in U.S. Pat. Nos. 3,041,317, 3,282,875, 2,624,053 and 4,025,405. By varying the time of reaction in the first step (reaction with N$_2$H$_4$) and the locus of reaction (i.e., only one or both sides of the film), only a part or all the thickness of the SO$_2$F membrane film may be converted to COOH groups. Where only part of the thickness (either on one or both sides) is so converted, the remaining SO$_2$F groups are hydrolyzed by water or alkali metal hydroxide to -SO$_3$A groups, where A is, as previously defined, H, Na or K. Such membrane films are equally satisfactory in the invention process and are to be understood to be encompassed in the invention process herein described and claimed as embodiment 2.

The cation A in the —CO$_2$A groups (and any SO$_3$A groups present) of the membrane will mostly be the same alkali metal as present in the chloride salt being electrolyzed to the carbonate salt. While the acid or other alkali metal salt form can be employed at start-up, it will be appreciated that the membrane will exchange virtually all of these cations for the cation of the salt being electrolyzed within a relatively short period of cell operation. Consequently, best practice dictates using a membrane having Na cations when NaCl is electrolyzed, and K cations for the electrolysis of KCl.

While the invention can be operated either as a batch or continuous process, as a practical matter it will normally be conducted on a continuous basis, and, hence, the following description of the invention operating parameters will be directed primarily to such a mode of operation, with the understanding that the same parameters and considerations generally apply to a batch process.

The invention process can be used to produce any alkali metal carbonate starting with the corresponding alkali metal chloride. Thus, sodium potassium and lithium carbonates are made from sodium, potassium and lithium chlorides respectively. While mixtures of alkali metal carbonates can be electrolytically produced simultaneously in one cell, there is no demand for such mixtures and, therefore, the invention process is used primarily to produce each singularly.

As in the conventional electrolysis of alkali metal halides to form chlorine and alkali metal hydroxide and hydrogen, the alkali metal chloride is charged to the anode compartment to become the cell anolyte as an aqueous solution commonly referred to as "brine". The brine typically is acidified with an acid, such as hydrochloric acid, to a pH of about 3 or less to minimize oxygen evolution at the anode and to minimize the formation from any polyvalent cation impurities that might be present in the brine, such as Ca$^{++}$ and Mg$^{++}$, of insoluble precipitates in the anolyte near the membrane surface.

Alternatively or in addition to the aforedescribed control of pH, the deleterious effect of polyvalent cation impurities can be minimized by adding to the brine a compound capable of forming at a pH of greater than 5.5 an insoluble gel with said polyvalent cations at the anolyte-membrane interface, said gel being reversible at a pH of less than 3.0, as disclosed in U.S. Pat. No. 3,793,163. Illustrative of such gel-forming compounds that can be used in the present invention are alkali metal phosphate, orthophosphate, and methaphosphate (preferably having the same alkali metal as the charged brine) or the free acid form of these phosphates. The use of such gel-forming compounds is especially efficacious, and hence preferred, when membrane films having a thickness of about 8 mils or less are employed since, it is believed, such gels may assist in reducing chloride impurities in the ultimate carbonate product.

Typically, in a preferred mode of operation, the brine is charged at or close to saturation in order to maximize the anolyte concentration and, hence, minimize the voltage requirements of the cell. Also affecting the anolyte concentration are the rate of charging the brine and the current density of the cell. More rapid brine-charging rates increase anolyte solids while higher cell current densities, conversely, more rapidly deplete anolyte solids. Ideally, these three interrelated parameters are chosen and controlled so that the anolyte at any given instant will have a solids concentration of about 75% or greater of saturation in order to minimize the voltage requirements of the cell. Anolyte concentrations of less than 75% of saturation, of course, are equally suitable when higher cell voltages are acceptable.

In the cathode compartment 4, electrolyte is charged at the startup of the process to provide initial catholyte. Typically, this electrolyte will have the same alkali metal as the brine and will be a carbonate salt to facilitate rapid equilibrium. After startup, the catholyte is continuously replenished during electrolysis by the alkali metal ion of the charged brine migrating through the membrane.

In the invention process, carbon dioxide gas is injected into the catholyte in such a manner that it and/or the alkali metal bicarbonate formed by its reaction with the alkali metal carbonate reacts with the alkali metal hydroxide (formed from the alkali metal ions migrating through the membrane 2 and the hydroxyl ions generated at the cathode 7) primarily in the catholyte space 15 between the membrane 2 and the cathode 7. This is efficiently accomplished by directly injecting carbon dioxide into catholyte space 15 preferably at or near the bottom of cell. In the cell of FIG. 1 this can be achieved by introducing carbon dioxide into the cathode compartment 4 through inlet 16. Alternatively, the carbon dioxide can be introduced into the cathode compartment 4 through inlet 18 into catholyte space 17 where it and/or alkali metal bicarbonate formed by the reaction with alkali metal carbonate can be carried by catholyte currents (generated by hydrogen evolution and ebullition) around and through the cathode 7 (which, as previously described, normally will be foraminous) into the catholyte space 15. Lastly, both inlets 16 and 18 can be used to introduce the carbon dioxide into the catholyte. However, in some instances, introducing some or all of the carbon dioxide behind the cathode may be less preferred, as for example, when pure hydrogen gas is desired or when the cell has poor catholyte circulation. In the cell of FIG. 2 carbon dioxide, as previously explained, is introduced into catholyte space 15 via the plurality of apertures 19 disposed in the surface member 20 of the hollow cathode 7a facing the membrane 2. As is apparent, in all these various modes, carbon dioxide is preferably added at or near the bottom of the cell to maximize its absorption and reaction in the catholyte.

The quantity of carbon dioxide injected into the catholyte compartment should be sufficient to give catholyte solids containing at least about 90% by weight of the desired carbonate salt if high current efficiencies, i.e., on the order of about 90% or greater, are to be attained. More preferred, however, is the use of carbon dioxide in quantities producing about 95% by weight or more of alkali metal carbonate in the catholyte solids, since current efficiencies are maximized in this range, generally exceeding 95%. For this reason, the stoichiometric quantity of carbon dioxide for producing essentially only carbonate salt is ideally and most preferably used. When less than stoichiometric is used, the carbonate product will contain minor amounts of the alkali metal hydroxide, while a stoichiometric excess results in carbonate product containing a minor quantity of the bicarbonate salt.

The carbon dioxide employed in the invention process may be essentially 100% pure or may be admixed with other gasses such as nitrogen and oxygen, as for example when flue gases resulting from the combustion of coal, gas, oil and the like are used as the source of the carbon dioxide. However, flue-gas carbon dioxide will not normally be used when high-purity by-product hydrogen gas is desired.

The width of the catholyte space 15 between the membrane 2 and the cathode 7, ideally is that distance which minimizes the cell voltage required to establish and maintain the desired cell current density. Generally, at any given set of cell operating conditions, cell voltage will vary with this distance, with the optimum distance being primarily dependent on cell current density, and secondarily on the purity of the carbon dioxide employed. Because of the gas blanketing effect on the cathode 7 caused by hydrogen evolution and ebullition and further considering the possible presence of carbon dioxide gas in catholyte space 15, both of which increase with higher current densities, the width of the catholyte space 15 often, depending upon cathode design, must be increased as the density of the electrolyzing current is raised if minimum cell voltages are to be realized. When carbon dioxide containing other gases, such as flue gas, is employed, usually the distance also must be increased to compensate for the gas blanketing effect contributed by these other gases. Still another factor affecting this optimum distance is the cell configuration, particularily when the carbon dioxide is introduced between the membrane and cathode primarily near the bottom of the cell. Cells having high height-to-width ratios generally require greater distances. From a practical standpoint, bearing in mind all these interrelated factors, the distance between the membrane 2 and the cathode 7 in the catholyte space 15 should be chosen so that the operating voltage of the cell will not exceed by more than about 10% the minimum voltage observed when the optimum distance is employed. Widths of cathode space 15 meeting this criteria typically will be about 0.10 to 1.0 inch for cell current densities in the range of 1 to 5 amperes per square inch.

With respect to the spacing of the anode 5 from the membrane 2, this distance ideally is the minimum that maintains high current efficiency with respect to chlorine generation, and minimizes the cell voltage. Usually, depending on cell and anode design and characteristics, minimum voltage and excellent chlorine current efficiency are achieved when the anode is contiguous to and touching the membrane. Sometimes though, a small spacing, such as about 0.05–0.20 inch, will be optimum.

Normally, the concentration of catholyte solids consisting of carbonate salt, plus any by-product hydroxide or bicarbonate present, will be that naturally occurring under the conditions of cell operation utilized, and idealy will be about 75 to 100% of saturation so as to minimize voltage requirements and the cost of removing water from the final carbonate product. When necessary to prevent precipitation of the carbonate salt, external water may be added to the catholyte. This is usually required when the alkali metal carbonates are produced from anolyte brines having concentrations at or near their saturation points.

The temperatures of the anolyte and catholyte in the invention process are not especially critical with respect to achieving high current efficiency. However, because voltage diminishes as the temperature increases, temperatures of about 90° C. or more are preferrably utilized when it is desired to minimize the power consumed per unit of carbonate salt product.

Similarily, the hydrostatic pressure of the anolyte and catholyte is not particularily critical with respect to obtaining high current efficiency. As a practical matter though, a net positive pressure will normally be maintained on the catholyte side to ensure the required cathode-membrane spacing, and particularily when the cell is operated with the anode and membrane in the contiguous and touching configuration.

In the invention process, a magnitude of current density in excess of one ampere per square inch (asi) is utilized that reduces the alkali metal chloride level in the catholyte solids to less than 400 parts per million (ppm). Surprisingly, it has been discovered that for any particular aforedescribed membrane utilized in the invention process, the level of chloride salt impurity decreases as the magnitude of the current density increases. The magnitude of current density required to achieve this low level of salt impurity will vary depending upon the thickness and equivalent weight of the membrane utilized.

Generally, very thin membranes, as for example 3.5 mils thick, having equivalent weights of 1100 or less generally require about 3 or more amperes of current per square inch of membrane area to reduce the chloride salt to the desired level of less than 400 parts per million parts of catholyte solids. Five-mil membranes of the same equivalent weight and seven-mil membrane of about 1200 equivalent weight, on the other hand, usually achieve levels below 400 ppm in the 1.5–2.0 asi range of current densities. While exact limits cannot be precisely delineated, current densities suitable for any particular membrane and degree of product purity can be readily ascertained from the foregoing considerations.

The catholyte is typically discharged from the cathode compartment at a rate proportional to the rate of transport of the hydrated alkali metal ions through the membrane (proportional to current density) and the rate of any external water added to the catholyte so as to maintain an essentially constant catholyte volume. After being discharged, the catholyte typically is transported to a holding tank prior to further processing such as concentrating, drying or packaging for shipment. At this point any residual by-product hydroxide or bicarbonate can be chemically removed if deemed undesirable in the final product. Residual alkali metal hydroxide is simply removed by adding either carbon dioxide or a bicarbonate salt (of the same alkali metal as the carbonate product) in a quantity sufficient to convert the by-product hydroxide present to the carbonate salt. Residual bicarbonate salt, on the other hand, can be removed by one or combination of the following two means. If the carbonate product is concentrated or dried, the first means consists of employing temperatures sufficiently high for a period adequate to decompose the residual bicarbonate to the carbonate salt. Alternatively, the residual alkali metal bicarbonate in the discharged catholyte is reacted with a stoichiometric quantity of a hydroxide of the same alkali metal.

Alkali metal carbonates, and particularly the sodium and potassium carbonates, are well known large volume industrial chemicals. Like the products of the prior art, the alkali metal carbonate produced by the invention process can be marketed either as liquors or as anhydrous or hydrated solid materials and are produced from the discharged catholyte by means conventional to the industry such as concentrating, drying and the like. Similarly, they can be used for like end uses such as: in the manufacture of glass, alumina, paper and detergents; as the precursor of other alkali metal compounds; and as regenerable absorbents for carbon dioxide and hydrogen sulfide. As can be appreciated, many industrial applications do not require alkali metal carbonates of absolute purity with respect to alkali metal hydroxide or bicarbonate and, hence, can employ carbonate products made by the invention process containing minor amounts (e.g., 3%) of these by-products.

While the preceding description has been directed, for clarity, to single cells, it will be obvious that in commercial operation a plurality of such cells will usually be combined in a single electrolyzing unit either in a series arrangement using bipolar electrodes or in a parallel configuration using monopolar electrodes.

What is claimed is:

1. In a method for producing an alkali metal carbonate wherein:

A. an alkali metal chloride is electrolyzed in an electrolytic cell having an anode and cathode in anolyte and catholyte compartments separated by a permselective cation-exchange membrane that is impervious to hydraulic flow and is spaced apart from the cathode;

B. carbon dioxide is injected into the catholyte compartment to give catholyte solids wherein substantially all of the alkali metal hydroxide formed therein is converted to alkali metal carbonate; and C. catholyte containing the alkali metal carbonate is removed from the catholyte compartment;

the improvement which comprises:

D. utilizing a membrane which:
      1. consists essentially of a film having a thickness not exceeding 8 mils of a copolymer having recurring structural units of the formula:

and (II) $-CXX'-CF_2-$ wherein R represents the group

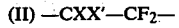

in which Y is fluorine or trifluoromethyl, G is $-CF_2-$ or

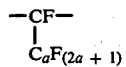

m is 1, 2 or 3, e is 0 or 1, and a is an integer from 1 to 10; n is 0 or 1; A is H, Na, or K; X is fluorine, chlorine, or trifluoromethyl; X' is X or $CF_3+CF_2+_z$ wherein z is 0 or an integer from 1 to 5; the units of formula (I) being present in an amount to provide a copolymer having in the acid form an $-CO_2H$ equivalent weight of about 800 to 1400; and 2. is capable when immersed in 100° C. water of absorbing at least 15% by weight water; and E. utilizing an electrolyzing current density in excess of one ampere per square inch of membrane area of sufficient magnitude to reduce alkali metal chloride in the catholyte solids to less than 400 parts per million.

2. The method of claim 1 wherein the electrolyzing current density utilized is of sufficient magnitude to reduce the alkali metal chloride impurity in the catholyte solids to less than 200 parts per million.

3. The method of claim 1 wherein the membrane copolymer film has a thickness not exceeding about 5 mils.

4. The method of claim 3 wherein the electrolyzing current density utilized is of sufficient magnitude to reduce the alkali metal chloride impurity in the catholyte solids to less than 200 parts per million.

5. The method of claim 1 wherein the membrane film consists essentially of a copolymer having recurring structural units of the formula:

$$-CF_2-CF_2-$$

and $$-CF_2-CF- \\ \phantom{-CF_2-}| \\ \phantom{-CF_2-}O-CF_2-CF-O-CF_2-CF_2-CO_2A \\ \phantom{-CF_2-OOOOOOOOOO}| \\ \phantom{-CF_2-OOOOOOOOOO}CF_3$$

or $$-CF_2-CF- \\ \phantom{-CF_2-}| \\ \phantom{-CF_2-}O-CF_2-CF-O-CF_2-COOA \\ \phantom{-CF_2-OOOOOOOOOO}| \\ \phantom{-CF_2-OOOOOOOOOO}CF_3$$

and has an $-CO_2H$ equivalent weight of about 900 to 1200.

6. The method of claim 5 wherein the electrolyzing current density utilized is of sufficient magnitude to reduce the alkali metal chloride impurity in the catholyte solids to less than 200 parts per million.

7. The method of claim 5 wherein the membrane copolymer film has a thickness not exceeding about 5 mils.

8. The method of claim 7 wherein the electrolyzing current density utilized is of sufficient magnitude to reduce the alkali metal chloride impurity in the catholyte solids to less than 200 parts per million.

9. The method of claim 5 wherein the alkali metal chloride electrolyzed is potassium chloride and A is potassium.

10. The method of claim 5 wherein the alkali metal chloride electrolyzed is sodium chloride and A is sodium.

11. The method of claim 1 wherein the alkali metal chloride electrolyzed is potassium chloride and A is potassium.

12. The method of claim 1 wherein the alkali metal chloride electrolyzed is sodium chloride and A is sodium.

13. The method of claim 1 further characterized in that the membrane film comprises two layers having a total thickness not exceeding about 8 mils: the first layer comprising a copolymer as defined in paragraph D.1. wherein e is 0; the second layer comprising a copolymer having recurring structural units of the formula $$(II) -CXX'-CF_2-$$

and $$(III) -CF-CF_2 \\ \phantom{(III)}| \\ \phantom{(III)}(R)_n \\ \phantom{(III)}| \\ \phantom{(III)}SO_3A$$

wherein X, X', R, n, and A are the same as in the copolymer of the first layer with the exception that e is 1 and G is $-CF_2-$, and having the capability of absorbing at least 15 percent by weight water when immersed in 100° C. water.

14. The method of claim 13, wherein $$(I) \text{ is } -CF_2-CF- \\ \phantom{(I) \text{ is }}| \\ \phantom{(I) \text{ is }}O-CF_2-CF-O-CF_2-CO_2A \\ \phantom{(I) \text{ is }OOOOOOOOOO}| \\ \phantom{(I) \text{ is }OOOOOOOOOO}CF_3$$

(II) is $-CF_2-CF_2-$, and $$(III) \text{ is } -CF_2-CF- \\ \phantom{(III) \text{ is }}| \\ \phantom{(III) \text{ is }}O-CF_2-CF-O-CF_2-CF_2-SO_3A \\ \phantom{(III) \text{ is }OOOOOOOOOO}| \\ \phantom{(III) \text{ is }OOOOOOOOOO}CF_3$$

15. The method of claim 14 wherein the alkali metal chloride electrolyzed is potassium chloride and A is potassium.

16. The method of claim 14 wherein the alkali metal chloride electrolyzed is sodium chloride and A is sodium.

17. The method of claim 13 wherein the alkali metal chloride electrolyzed is potassium chloride and A is potassium.

18. The method of claim 13 wherein the alkali metal chloride electrolyzed is sodium chloride and A is sodium.

* * * * *